United States Patent
Michalske

(10) Patent No.: US 9,518,893 B2
(45) Date of Patent: Dec. 13, 2016

(54) METHOD AND CONTROL UNIT FOR DETERMINING A DEAD TIME OF AN EXHAUST GAS SENSOR OF AN INTERNAL COMBUSTION ENGINE

(71) Applicant: Robert Bosch GmbH, Stuttgart (DE)

(72) Inventor: Andreas Michalske, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 14/374,759

(22) PCT Filed: Dec. 5, 2012

(86) PCT No.: PCT/EP2012/074415
§ 371 (c)(1),
(2) Date: Jul. 25, 2014

(87) PCT Pub. No.: WO2013/110385
PCT Pub. Date: Aug. 1, 2013

(65) Prior Publication Data
US 2015/0013442 A1     Jan. 15, 2015

(30) Foreign Application Priority Data

Jan. 25, 2012    (DE) .................. 10 2012 201 033

(51) Int. Cl.
*G01M 15/10*    (2006.01)
*F02D 41/14*    (2006.01)
(Continued)

(52) U.S. Cl.
CPC ........ *G01M 15/102* (2013.01); *F02D 41/1454* (2013.01); *F02D 41/1458* (2013.01);
(Continued)

(58) Field of Classification Search
CPC .................. F02D 41/1495; F02D 2041/1432; F02D 41/1458; F02D 41/1454; F02D 41/1461; F02D 41/18; F02D 41/222; G01M 15/102
(Continued)

(56) References Cited

U.S. PATENT DOCUMENTS 5,915,368 A * 6/1999 Ishida .................. F02D 41/047
123/675
6,287,453 B1 * 9/2001 Rosel .................. F02D 41/1408
123/688
(Continued)

FOREIGN PATENT DOCUMENTS

DE    10 2007 050 0026    4/2009
DE    10 2008 001 121     10/2009
(Continued)

OTHER PUBLICATIONS

International Search Report for PCT/EP2012/074415, dated Apr. 25, 2013.
(Continued)

*Primary Examiner* — Freddie Kirkland, III
(74) *Attorney, Agent, or Firm* — Norton Rose Fulbright US LLP; Gerard Messina

(57) ABSTRACT

In a method for determining a dead time in the response characteristic of an exhaust gas sensor in order to determine an exhaust gas state quantity in an exhaust gas duct of an internal combustion engine, the dead time is determined from a measured output signal of the exhaust gas sensor and a comparison signal. An undelayed comparison signal is determined, and a cross-correlation is formed between the measured output signal and the comparison signal delayed by a model dead time selected in such a way that the cross-correlation function assumes a maximum, and the
(Continued)

dead time of the measured output signal is set equal to the selected model dead time.

13 Claims, 3 Drawing Sheets

(51) Int. Cl.
    *F02D 41/18*          (2006.01)
    *F02D 41/22*          (2006.01)

(52) U.S. Cl.
    CPC ...... *F02D 41/1495* (2013.01); *F02D 41/1461* (2013.01); *F02D 41/1481* (2013.01); *F02D 41/18* (2013.01); *F02D 41/222* (2013.01); *F02D 2041/1432* (2013.01)

(58) Field of Classification Search
    USPC ...................................................... 73/114.71
    See application file for complete search history.

(56) References Cited

U.S. PATENT DOCUMENTS

| | | | | |
|---|---|---|---|---|
| 8,245,566 | B2 * | 8/2012 | Wehmeier | F02D 41/1495 73/114.72 |
| 8,245,689 | B2 * | 8/2012 | Wagner | F02D 41/0007 123/316 |
| 8,381,567 | B2 * | 2/2013 | Wehmeier | F02D 41/1474 701/29.8 |
| 2009/0101108 | A1 * | 4/2009 | Wagner | F02D 41/0007 123/350 |
| 2010/0083743 | A1 * | 4/2010 | Wehmeier | F02D 41/1495 73/114.72 |
| 2011/0184700 | A1 * | 7/2011 | Michalske | F02D 41/1495 702/182 |
| 2015/0101582 | A1 * | 4/2015 | Uhrich | F01N 11/007 123/672 |
| 2015/0219033 | A1 * | 8/2015 | Jammoussi | F02D 41/1454 701/104 |

FOREIGN PATENT DOCUMENTS

| | | |
|---|---|---|
| DE | 10 2008 040 737 | 1/2010 |
| DE | 10 2008 042 549 | 4/2010 |
| EP | 1 074 718 | 2/2001 |
| GB | 2 342 175 | 4/2000 |

OTHER PUBLICATIONS

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976.

Todd Messer J., et al., "Measurement Delays and Modal Analysis for a Heavy Duty Transportable Emissions Testing Laboratory", SAE Technical Paper, Jan. 1, 1995, pp. 87-104.

* cited by examiner

METHOD AND CONTROL UNIT FOR DETERMINING A DEAD TIME OF AN EXHAUST GAS SENSOR OF AN INTERNAL COMBUSTION ENGINE

BACKGROUND OF THE INVENTION

1. Field of the Invention

The present invention relates to a method for determining a dead time $T_S$ in the response characteristic of an exhaust gas sensor in order to determine an exhaust gas state quantity in an exhaust gas duct of an internal combustion engine, the determination of the dead time $T_S$ taking place from a measured output signal of the exhaust gas sensor or a measured characteristic quantity derived therefrom, and from a comparison signal or comparison characteristic quantity derived therefrom. In addition, the present invention relates to a control unit for controlling an internal combustion engine and for determining a dead time $T_S$ in the response characteristic of an exhaust gas sensor, the control unit containing means for measuring an output signal of the exhaust gas sensor and/or for determining a characteristic quantity derived therefrom, and the control unit containing means for determining a comparison signal and/or for determining a comparison characteristic quantity derived therefrom.

2. Description of the Related Art

In the context of on-board diagnosis (OBD) for the operation of internal combustion engines, OBD-II regulations require that lambda sensors and other exhaust gas sensors be monitored not only with regard to their electrical functional capability, but also with regard to their response characteristic. A worsening of the sensor dynamic, which can become noticeable through an enlarged time constant or a longer dead time $T_S$, must be recognized. Such time delays between a change in the composition of the exhaust gas and the recognition thereof must be monitored on board to see whether they are still permissible for user functions, i.e. for control, regulation, and monitoring functions that use the sensor signal. As a characteristic quantity for the dynamic characteristics of exhaust gas sensors, typically the dead time $T_S$ of a change in the mixture of the fuel-air mixture supplied to the internal combustion engine up to the associated signal edge of the exhaust gas sensor is used. The dead time $T_S$ is determined primarily by the gas runtime from the outlet of the internal combustion engine to the exhaust gas sensor, and changes for example when there is a manipulation of the location of installation of the sensor.

In order to set an air-fuel mixture supplied to the internal combustion engine, standardly lambda sensors are used as exhaust gas sensors, which determine the oxygen content of the exhaust gas. In diesel engines, for example lambda sensors in the form of broadband lambda sensors can be used. In addition, in connection with SCR (Selective Catalytic Reduction) catalytic converters for the conversion, using urea, of nitrogen oxides into carbon dioxide, nitrogen, and water, $NO_x$ sensors are provided. $NO_x$ sensors additionally supply an oxygen signal.

The dead time $T_S$ of the oxygen signal is monitored, using known methods, when there is a transition of the internal combustion engine from load to overrun. Here, the oxygen portion increases from a portion specified by the operating point of the internal combustion engine under load to the oxygen content of air, which is 21%. If, after a maximum time, the sensor signal does not reach a specified intermediate value, this is interpreted as a dead time error.

For future generations of vehicles, or model years, it is to be expected that a monitoring of the sensor dynamics will also be required when there is a decreasing oxygen concentration. Moreover, in hybrid vehicles in the future there will no longer be overrun phases, and thus no phases having a constant oxygen concentration of 21%.

Published German patent application document DE 10 2008 001 121 A1 describes a direction-dependent dead time monitoring. The patent discloses a method of diagnosing at least one exhaust gas sensor situated in the exhaust gas system of an internal combustion engine, in which a change in signal is compared with an expected change in signal. Here it is provided that a special operating state of the internal combustion engine is recognized, and that, in this special operating state of the internal combustion engine, for diagnosis a test injection is carried out that is torque-neutral or is not disturbing to the operator of the internal combustion engine. A special operating state can here be a overrun phase of the internal combustion engine. The determination of dead time $T_S$ can take place by determining an actual delay time from the time delay until the signal of the exhaust gas sensor follows the change in the exhaust gas composition, and comparing the actual delay time with a stored or calculated target delay time. A disadvantage here is that the active monitoring represents an intervention in the fuel system of the internal combustion engine, so that both fuel consumption and $CO_2$ emissions are increased.

For the determination of dead times, outside engine controlling the principle of cross-correlation is known. This principle is described for example in "The Generalized Correlation Method for Estimation of Time Delay," IEEE Transactions on Acoustics, Speech, and Signal Processing, vol. ASSP-24, no. 4, August 1976, by C. H. Knapp and G. C. Carter. A first and second signal to be compared, both triggered by the same cause, are then first filtered. Subsequently, the second signal is temporally delayed by a delay time. The signals obtained in this way are multiplied by one another corresponding to a cross-correlation function, and are integrated over a specified time span. A subsequently situated peak detector varies the delay time until a maximum of the cross-correlation function, i.e. of the multiplied and integrated signal, is present. At the maximum, the delay time corresponds to dead time T between the first and second signal. Dead time measurements using cross-correlation are used for example in laser distance measurement or in radar technology in order to determine the distance from an object.

BRIEF SUMMARY OF THE INVENTION

The object is to provide a method for monitoring the dead time $T_S$ of exhaust gas sensors situated in the exhaust gas duct of an internal combustion engine.

Furthermore, the object of the present invention is to provide a corresponding control unit for carrying out the method.

The object relating to the method is achieved in that an undelayed comparison signal, or an undelayed comparison characteristic quantity derived therefrom, is determined, and that a cross-correlation is formed between the measured output signal or the measured characteristic quantity derived therefrom and the comparison signal delayed by a model dead time $T_M$ or the comparison characteristic quantity derived therefrom and delayed by model dead time $T_M$, and that model dead time $T_M$ is selected such that the cross-correlation function assumes a maximum value and that dead time $T_S$ of the measured output signal of the exhaust gas sensor is set equal to model dead time $T_M$ determined in this way. Dead time $\tau_S$ is determined primarily by the gas runtime from the internal combustion engine to the exhaust gas sensor. The undelayed comparison signal, or the undelayed comparison characteristic quantity derived therefrom, corresponds to the undelayed curve of the exhaust gas state quantity, preferably at the outlet of the internal combustion engine. Model dead time $\tau_M$ is for example iteratively modified until the measured output signal, and the delayed comparison signal corresponding to model dead time $\tau_M$ or the characteristic quantities derived therefrom, are maximally congruent. Model dead time $\tau_M$ then corresponds, to a good approximation, to dead time $\tau_S$ of the exhaust gas sensor. The criterion for the congruence, or similarity, of the signals is their cross-correlation function, which assumes its maximum when the best possible congruence is reached.

The method enables a uniform monitoring design both for the increase and for the decrease of the exhaust gas state quantity that is to be measured, for example a gas concentration. This is a passive method that does not require intervention in the air or fuel system of the internal combustion engine. Because the method is not bound to particular operating points of the internal combustion engine, a high degree of availability results.

Further advantages of the method are the high degree of robustness against disturbances, and the low complexity of the method, with a correspondingly low application outlay in its realization. Faulty measurements due to false edge assignments relating to the cause (change in the exhaust gas state quantity) and effect (output signal of the exhaust gas sensor) can be reliably prevented by a sufficiently large integration time duration, and non-periodic excitation.

A determination of a suitable undelayed comparison signal or of an undelayed comparison characteristic quantity derived therefrom that is simple and that can be realized at low cost for example through a software expansion in an existing control unit can be achieved in that the undelayed comparison signal, or the undelayed comparison characteristic quantity derived therefrom, is modeled. For this purpose, first the exhaust gas state quantity to be determined can be modeled, for example at an outlet of the internal combustion engine, and from this the undelayed comparison signal, or comparison characteristic quantity derived therefrom, can be determined.

The dynamic characteristic of the exhaust gas sensor can be reproduced in the determination of the comparison signal, for example through a corresponding modeling, in that before the formation of the cross-correlation a low-pass filtering is carried out of the comparison signal or of the comparison characteristic quantity derived therefrom.

In addition, the selectivity of the dead time measurement can be increased in that before the formation of the cross-correlation a high-pass filtering is carried out of the measured output signal or of the measured characteristic quantity derived therefrom and of the comparison signal or of the comparison characteristic quantity derived therefrom. Through the high-pass filtering, only the dynamic phases are taken into account in the signal comparison.

The high-pass filtering of the measured output signal, or of the measured characteristic quantity derived therefrom, can take place using a high-pass filter. The low-pass filtering and the high-pass filtering of the comparison signal, or of the comparison characteristic quantity, can advantageously take place using a corresponding bandpass filter. The low-pass characteristic of the real exhaust gas sensor and of the downstream high-pass filter likewise yield the characteristic of a bandpass filter. The high-pass filter and the high-pass portion of the bandpass filter advantageously have the same cutoff frequency, which is below the cutoff frequency of the low-pass filtering.

Corresponding to a particularly preferred variant embodiment of the present invention, it can be provided that a sensor time constant $\tau_S$ of the exhaust gas sensor is determined, and that a low-pass filter time constant $\tau_M$ of the low-pass filtering is set equal to the sensor time constant $\tau_S$. Sensor time constant $\tau_S$ describes the dynamic with which the exhaust gas sensor reacts to a change in the exhaust gas state quantity that is to be determined. A method for determining sensor time constant $\tau_S$ is described for example in document R. 339892 of applicant (not yet published). Through the adaptation of low-pass filter time constant $\tau_M$ to sensor time constant $\tau_S$ of the present exhaust gas sensor, the current dynamic of the exhaust gas sensor can be taken into account. As a result, the determination of dead time $\tau_S$ is not falsified by an exhaust gas sensor that has become slower, for example due to soot.

Preferably, as a cross-correlation function a normed energy cross-correlation function, or the square of a normed energy cross-correlation function, can be used. Here, the cross-correlation function contains in the denominator the signal energies of the measured output signal and of the comparison signal after frequency filtering, and in the numerator contains the cross-energy of the signals. Through the use of the normed cross-energy, multiplicative errors of the exhaust gas sensor or in the formation of the comparison signal, as well as the influence of the signal stroke of the excitation, i.e. of the change in the exhaust gas state quantity to be determined, are eliminated.

Corresponding to a preferred variant embodiment of the present invention, it can be provided that an integration time span T in the calculation of the energy cross-correlation function includes one or more edges of a change in the exhaust gas state quantity. If integration time span T includes only one edge, then the result of the diagnosis is automatically selective for direction, i.e. positive and negative changes in the exhaust gas state quantity are evaluated separately. If, through a correspondingly longer integration time span, a plurality of edges of a change in the exhaust gas state quantity are acquired, then the precision in the determination of dead time $\tau_S$ can be improved.

Here it can be provided that integration time span T begins in a time-controlled or in an event-controlled manner. An event-controlled beginning of integration time span T can for example be connected to an edge of a change of the exhaust gas state quantity or to an edge of an injection quantity. If integration time span T begins at an edge of a change in the exhaust gas state quantity, then the start can be set to the earlier occurring edge of the measured output signal or of the comparison signal, or of the characteristic quantities derived therefrom.

In order to achieve a direction-selective determination of dead time $\tau_S$ with a high degree of precision, it can be provided that positive and negative edges of a change in the exhaust gas state quantity are evaluated separately. Integration time span T can then extend over a plurality of edges.

The direction-selective determination of dead time $\tau_S$ can be achieved in that a separate evaluation of positive and negative edges takes place through a high-pass filtering and subsequent saturation elements. In this way, it is achieved that either only positive or only negative signal portions are let through, so that a diode function results.

Corresponding to a further variant embodiment of the present invention, it can be provided that for the determination of the maximum of the cross-correlation, a volume value of the exhaust gas duct between the internal combustion engine and the location of installation of the exhaust gas sensor is varied in such a way that the cross-correlation function assumes a maximum. If no electrical manipulation is present, dead time $T_S$ corresponds to a gas runtime from the internal combustion engine to the exhaust gas sensor. The gas runtime is a function of the exhaust gas volume flow and of the volume of the exhaust gas system between the internal combustion engine and the location of installation of the exhaust gas sensor. Through calculative variation of the volume value assumed for the volume of the exhaust gas system, the gas runtime for the delay of the comparison signal can be varied in such a way that the measured output signal and the comparison signal are congruent. The volume value obtained in this way can be recalculated, taking into account the volume flow, to yield a dead time $T_S$.

The object of the present invention relating to the control unit is achieved in that the control unit contains means for determining an undelayed comparison signal, or for determining an undelayed comparison characteristic quantity derived therefrom, and that the control unit contains a program sequence or an electronic circuit for the formation of a cross-correlation between the measured output signal or the measured characteristic quantity derived therefrom and the comparison signal delayed by a model dead time $T_M$, or the comparison characteristic quantity derived therefrom, and that the control unit contains a maximum value recognition unit for the variation of model dead time $T_M$ and for recognizing a maximum of the cross-correlation function given a model dead time $T_M$. Such a control unit enables the described method to be carried out. Realization in an existing control unit is simple and low-cost, for example via a corresponding software expansion.

The method or the control unit can preferably be used to determine a dead time $T_S$ in the response characteristic of a broadband lambda sensor or of an $NO_x$ sensor. Here, both the broadband lambda sensor and also the $NO_x$ sensor react to a change in the oxygen content as exhaust gas state quantity of the exhaust gas. The method can also be applied to the $NO_x$ signal of an $NO_x$ sensor if a corresponding $NO_x$ comparison signal can be formed, for example using an $NO_x$ model.

A preferred application of the method and of the control unit with its above-described variants provides its use in hybrid vehicles, e.g. diesel hybrid vehicles, which do not have no-load operating phases or overrun phases. It is particularly to be emphasized that the use in hybrid vehicles does not limit the potential for reducing consumption and $CO_2$, because neither test injections nor special engine operating states are required.

A further preferred application of the method and of the control unit, with its above-described variants, provides its use in vehicles having a so-called coasting mode. In such vehicles, overrun operation is also omitted to the greatest possible extent. Instead of pulling the engine in overrun, in coasting operation the coupling is opened, the engine goes into no-load operation or is shut off, and the vehicle rolls due to inertia. Here as well, there is a significant potential for reduction of consumption and $CO_2$.

DETAILED DESCRIPTION OF THE INVENTION

Figure 1:
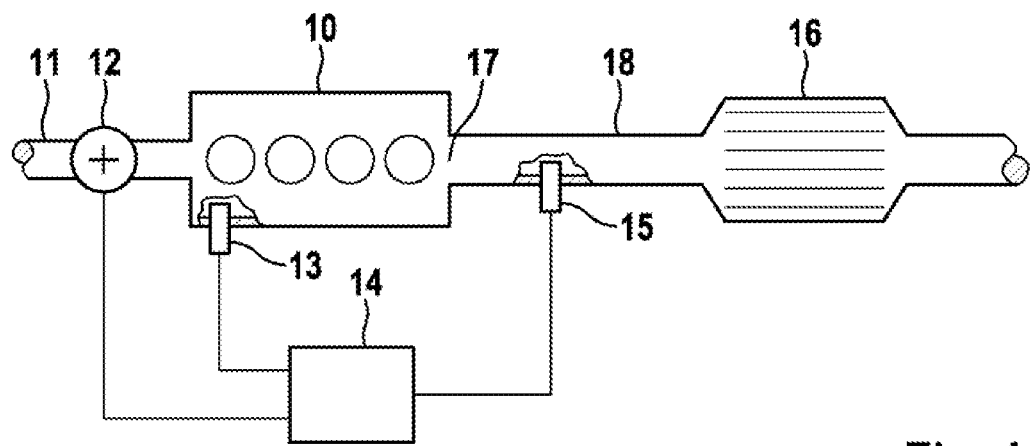
FIG. 1 shows, in schematic representation, the technical area in which the method according to the present invention can be applied.

FIG. 1 schematically shows, for the example of a spark-ignition engine, the technical area in which the method according to the present invention can be used to determine a dead time $T_S$ in the response characteristic of an exhaust gas sensor 15. Air is supplied to an internal combustion engine 10 via an air supply channel 11, and the mass thereof is determined using an air mass sensor 12. Air mass sensor 12 can be realized as a hot-film air mass sensor. The exhaust gas of internal combustion engine 10 is led off into an exhaust gas duct 18 via an outlet 17 of internal combustion engine 10, exhaust gas sensor 15 and an exhaust gas cleaning system 16 being provided in the direction of flow of the exhaust gas. Exhaust gas cleaning system 16 standardly includes at least one catalytic converter.

A control unit 14 is provided for controlling internal combustion engine 10. Control unit 14 is connected to exhaust gas sensor 15, to air mass sensor 12, and to fuel metering system 13.

During operation of internal combustion engine 10, control unit 14 regulates the supply of fuel and air to the internal combustion engine as a function of the demanded load. Here, measurement signals of exhaust gas sensor 15 and of air mass sensor 12 are taken into account. The supply of fuel to internal combustion engine 10 takes place via fuel metering system 13, and the regulation of the air supply takes place via a throttle valve (not shown) in air supply system 11. In the depicted exemplary embodiment, exhaust gas sensor 15 is a broadband lambda sensor, and determines an actual lambda value of the fuel-air mixture supplied to internal combustion engine 10.

Legal regulations concerning on-board diagnosis (OBD) dictate that exhaust gas sensors 15 be monitored with regard to their response characteristic. Dead times or delay times between a change in the exhaust gas composition and the recognition thereof must be monitored to see whether they are still permissible for user functions. Dead time $T_S$ is determined primarily by the runtime of the exhaust gas from outlet 17 of internal combustion engine 10 to the installation location of exhaust gas sensor 15, and changes for example when there is a manipulation of the installation location of exhaust gas sensor 15.

Figure 2:
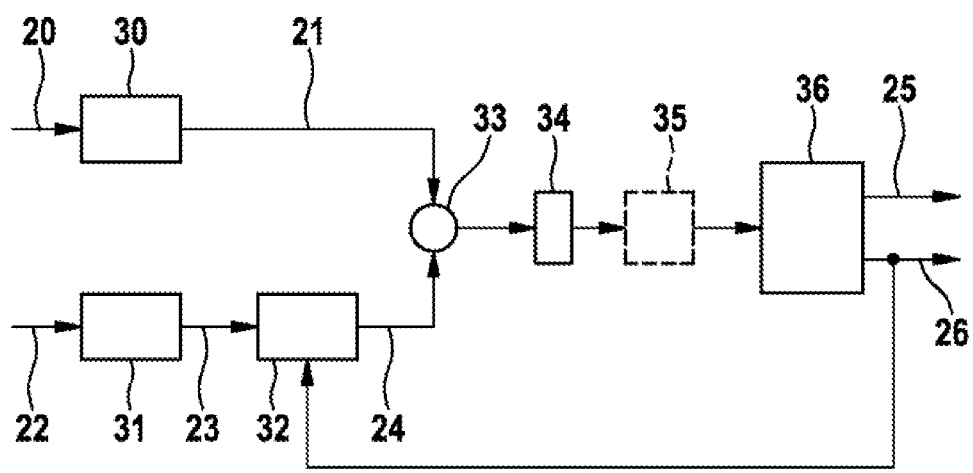
FIG. 2 shows a block diagram for determining dead time TS of an exhaust gas sensor.

FIG. 2 shows, in a block diagram, a basic structure of a circuit system or of a software function for determining dead time $T_S$ of exhaust gas sensor 15 shown in FIG. 1. Here, a cross-correlation method tailored to the application is used.

A measured output signal $x_1(t)$ 20 of exhaust gas sensor 15 is supplied to a first high-pass filter 30. A filtered output signal $y_1(t)$ 21 is conducted to a first multiplier 33.

An undelayed comparison signal $x_2(t)$ 22 is supplied to a bandpass filter 31 that forms therefrom a filtered comparison signal $y_2(t)$ 23. Filtered comparison signal $y_2(t)$ 23 is temporally delayed in a dead time element 32, so that a delayed comparison signal $y_2(t-T)$ 24 results. Delayed comparison signal $y_2(t-T)$ 24 is also supplied to first multiplier 33, and there it is multiplied by filtered output signal $y_1(t)$ 21. The signal thus obtained is supplied successively to a first integrator 34, to an optionally provided squaring unit 35, and, subsequently, to a maximum value recognition unit 36. Maximum value recognition unit 36 outputs, as the result of the cross-correlation, a normed cross-energy 25, or the square thereof, and a model dead time $T_M$ 26 that is conducted to dead time element 32. Squaring unit 35 is advantageous for the maximum value recognition, but is not necessarily required. The further description of the functioning is therefore based on the normed cross-energy 25, for which however the square of the normed cross-energy can also equivalently be used.

Measured output signal $x_1(t)$ 20 of exhaust gas sensor 15 that is to be monitored corresponds to an exhaust gas state quantity determined by exhaust gas sensor 15, for example an oxygen concentration, at the location of installation of the exhaust gas sensor. Undelayed comparison signal $x_2(t)$ 22 corresponds to the curve of the exhaust gas state quantity at outlet 17 of internal combustion engine 10. Undelayed comparison signal $x_2(t)$ 22 can for example be calculated using a suitable model. In this way, an oxygen concentration at outlet 17 of the internal combustion engine can be calculated from the measured air mass and from the target fuel mass supplied via fuel metering system 13.

Bandpass filter 31 contains a low-pass portion that reproduces the dynamic characteristic of exhaust gas sensor 15. The high-pass portion contained in bandpass filter 31, and first high-pass filter 30 in the signal curve of exhaust gas sensor 15, serve to increase the selectivity of the dead time measurement, in that only dynamic phases of the temporal curve of the exhaust gas state quantity are taken into account in the following signal comparison. First high-pass filter 30 and the high-pass portion of bandpass filter 31 have a uniform cutoff frequency and have a pass-through region that overlaps with that of the low-pass filter. In the case of steep-edged high- and low-pass filters, the high-pass cutoff frequency must therefore be below the low-pass cutoff frequency.

Using dead time element 32, filtered comparison signal $y_2(t)$ 23 is delayed by model dead time $T_M$ 26 outputted by maximum value recognition unit 36, so that delayed comparison signal $y_2(t-T)$ 24 results. The cross-correlation takes place through first multiplier 33, first integrator 34, and optionally provided first squaring unit 35. Here, the cross-energy of filtered output signal $y_1(t)$ 21 and of filtered comparison signal $y_2(t)$ 23 relate to the signal energies of filtered output signal $y_1(t)$ 21 and of filtered comparison signal $y_2(t)$ 23.

Maximum value recognition unit 36 changes model dead time $T_M$ 26 of dead time element 32, preferably iteratively, until filtered output signal $y_1(t)$ 21 and delayed comparison signal $y_2(t-T)$ 24 are maximally congruent. Model dead time $T_M$ 26 then corresponds, to a good approximation, to dead time $T_S$ that is to be determined of exhaust gas sensor 15. The criterion for the degree of congruence, or similarity, of filtered output signal $y_1(t)$ 21 and of delayed comparison signal $y_2(t-T)$ 24 is their cross-energy $E_{KK}$, obtained via the cross-correlation function, which assumes its maximum value when there is the best possible degree of congruence.

With the use of optional squaring unit 35, the square of the cross-energy can also be used as a criterion of similarity, because the squaring does not change the position of the maximum.

In order to adapt the model dead time in steps, the same measurement can be evaluated multiple times. For this purpose, the measurement and the undelayed comparison signal must be recorded for a useful time duration. Likewise, it is for example possible to carry out measurement and evaluation for different excitations given different model dead times. In an alternative specific embodiment, the evaluation for different model dead times can also be made parallel by executing parts of the block diagram according to FIG. 2 multiple times.

The described method enables a simple determination of dead time $T_S$ of exhaust gas sensor 15 using a unified monitoring principle for an increase and for a decrease in the exhaust gas state quantity to be measured. This is a passive method that does not require intervention in the air or fuel systems of internal combustion engine 10. It can also be used in vehicles that have no, or only a few, overrun and no-load phases, for example in hybrid vehicles. Further advantages are a high degree of availability in relevant certification cycles, high robustness against disturbances, avoidable risk of faulty measurements due to false edge assignment of cause (change in exhaust gas state quantity) and effect (output signal of the exhaust gas sensor), as well as low complexity and low application outlay.

Figure 3:
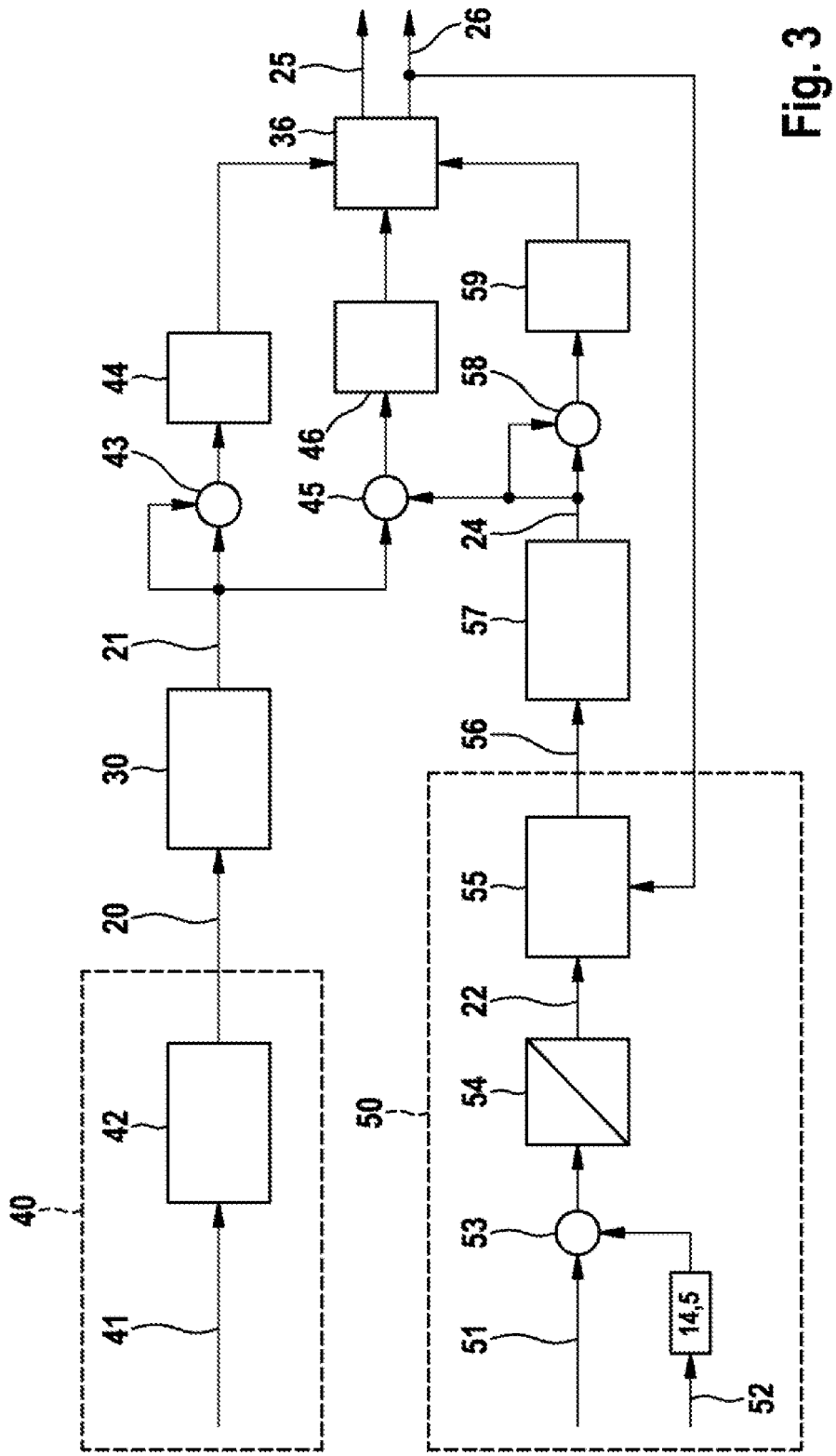
FIG. 3 shows a block diagram for the model-based dead time diagnosis of oxygen sensors.

FIG. 3 shows a block diagram for the model-based dead time diagnosis of oxygen sensors in the embodiment of a broadband lambda sensor as exhaust gas sensor 15. Here, the response characteristic of the broadband lambda sensor is represented by a real system 40. A model 50 supplies the required comparison signal.

In real system 40, an oxygen concentration 41 present in the exhaust gas at outlet 17 of internal combustion engine 10 is converted, corresponding to a sensor delay 42 of the broadband lambda sensor, into measured output signal $x_1(t)$ 20. From measured output signal $x_1(t)$ 20, filtered output signal $y_1(t)$ 21 is formed using first high-pass filter 30. Filtered output signal $y_1(t)$ 21 is supplied to a second multiplier 43 and to a third multiplier 45. After second multiplier 43 there are situated a second integrator 44 and, subsequently, maximum value recognition unit 36.

In model 50, an air mass 51 and a fuel mass 52 are supplied to a first division unit 53, and a lambda value formed there is supplied to a conversion unit 54. Conversion unit 54 forms the undelayed comparison signal $x_2(t)$ 22 shown in FIG. 2, in the form of a calculated oxygen content, which is supplied to a delay element 55. A modeled oxygen content 56 formed therein is supplied to a second high-pass filter 57. The obtained delayed comparison signal $y_2(t-T)$ 24 is conducted to third multiplier 45 and to a fourth multiplier 58. Fourth multiplier 58 is followed by a fourth integrator 59 and by maximum value recognition unit 36.

After third multiplier 45 there are provided a third integrator 46, and subsequently maximum value recognition unit 36. Maximum value recognition unit 36 supplies as output signals, as the result of the cross-correlation, the normed cross-energy 25 and a model dead time $T_M$ 26, which is supplied to delay element 55.

Real system 40 corresponds to the real broadband lambda sensor. The response characteristic of the broadband lambda sensor, for a given oxygen concentration 41 present at outlet 17 of internal combustion engine 10, can be described corresponding to the transmission function:

$$G_S(j\omega) = \frac{1}{1 + j\omega T_S} \cdot e^{-j\omega T_S} \quad (1)$$

by a dead time $T_S$ and a first-order low-pass filter having a sensor time constant $T_S$. Dead time $T_S$ is essentially given by the gas runtime from outlet 17 of internal combustion engine 10 to the broadband lambda sensor. Sensor time constant $T_S$ describes the dynamic of the broadband lambda sensor. Measured output signal $x_1(t)$ 20 corresponds to the output signal of the broadband lambda sensor.

The comparison signal is formed with the aid of model 50. From air mass 51 and fuel mass 52 supplied to internal combustion engine 10, after stoichiometric correction in first division unit 53 a lambda value is calculated. Fuel mass 52 can result from the desired torque specified by the driver. In a conversion unit 54, a calculated oxygen content at outlet 17 of internal combustion engine 10 is determined from the lambda value. The calculated oxygen content corresponds to undelayed comparison signal $x_2(t)$ 22. Corresponding to real system 40, from undelayed comparison signal $x_2(t)$ 22 modeled oxygen content 56 is formed according to a transmission function:

$$G_M(j\omega) = \frac{1}{1+j\omega T_M} \cdot e^{-j\omega \tau_M} \quad (2)$$

where $\tau$ is model dead time $\tau_M$ 26 and $T_M$ represents a model time constant. Modeled oxygen content 56 is delayed in comparison to undelayed comparison signal $x_2(t)$ 22 by model dead time $\tau_M$ 26. Model time constant $T_M$ is preferably selected equal to the actual value of sensor time constant $T_S$ of the broadband lambda sensor. In this way, in comparison to a fixedly set time constant there results the advantage that the dead time diagnosis is not falsified for example by an exhaust gas sensor 15 that has been made slower as a result of soot. Sensor time constant $T_S$ can be determined for example using a method as described in document R.339892 of applicant (not yet published).

Measured output signal $x_1(t)$ 20 and the signal for the modeled oxygen content 56 are each filtered in a high-pass filter 30, 57. High pass filters 30, 57 have the same high-pass filter time constant $T_F$, corresponding to the following transmission function:

$$G_F(j\omega) = \frac{j\omega T_F}{1+j\omega T_F} \quad (3)$$

In this way there results the filtered output signal $y_1(t)$ 21 and the delayed comparison signal $Y_2$ ($t$-$\tau$) 24.

In the exemplary embodiment, the cross-correlation takes place via the square of a normed energy cross-correlation function:

$$E_{KK}^2 = \frac{\left(\int_0^T y_1(t) y_2(t-\tau) dt\right)^2}{\int_0^T y_1^2(t) dt \cdot \int_0^T y_2^2(t-\tau) dt} \quad (4)$$

For this purpose, filtered output signal $y_1(t)$ 21 and delayed comparison signal $y_2$(t-$\tau$) 24 are each squared using a multiplier 43, 58, which supplies signals that correspond to a signal power level. These signals are subsequently integrated, by integrators 44, 59, over a specified integration time span T, so that the signal energies shown in the denominator of the cross-correlation function (4) result.

The cross-energy found in the numerator of the equation is formed in third multiplier 45 and in third integrator 46, from filtered output signal $y_1(t)$ 21 and delayed comparison signal $y_2$(t-$\tau$) 24 over specified integration time span T.

From the signal energies and the cross-energy of filtered output signal $y_1(t)$ 21 and of delayed comparison signal $y_2$(t-$\tau$) 24, corresponding to cross-correlation function (4), maximum value recognition unit 36 forms normed cross-energy $E_{KK}$ 25. Here, maximum value recognition unit 36 iteratively modifies model dead time $\tau_M$ 26 until normed cross-energy $E_{KK}$ 25 assumes its maximum. Normed cross-energy $E_{KK}$ 25 assumes its maximum when filtered output signal $y_1(t)$ 21 and delayed comparison signal $y_2$(t-$\tau$) 24 are maximally congruent. This is the case when model dead time $\tau_M$ 26 corresponds to dead time $\tau_S$ that is to be determined of the broadband lambda sensor.

Through the use of normed cross-energy $E_{KK}$ 25, multiplicative errors are eliminated both of model 50 and of real system 40, i.e. of the real exhaust gas sensor 15 that is present, as is the influence of the signal stroke of the excitation.

Integration time span T can include one or more edges of a change of the oxygen concentration of the exhaust gas.

The integration can begin in a time-controlled or event-controlled fashion. If event-controlled, the integration is for example started when the earlier of the two oxygen edges (measured or simulated) or one injection quantity edge is used. If only one edge is evaluated, the diagnostic result is direction-selective, and therefore counts only for a rise or decrease of the oxygen content.

Figure 4:
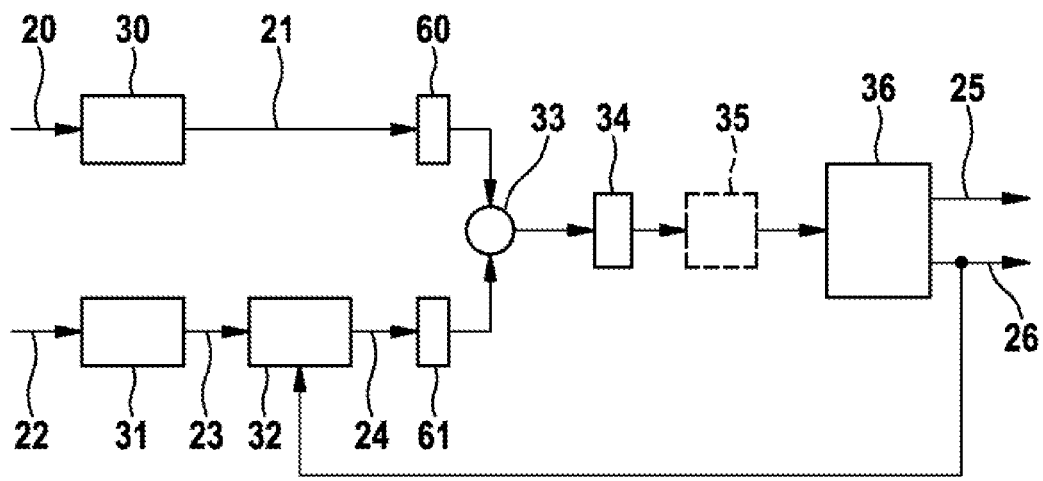
FIG. 4 shows a block diagram for the direction-selective monitoring of the dead time TS of an exhaust gas sensor.

FIG. 4 shows a block diagram for the direction-selective monitoring of dead time $\tau_S$ of an exhaust gas sensor 15. The circuit configuration, or software function, is essentially the same as described in relation to FIG. 2.

In addition, after first high-pass filter 30 there is provided a first saturation element 60, and after dead time element 32 there is provided a second saturation element 61. Saturation elements 60, 61 have a diode function, so that they allow either only positive or only negative signal portions to pass. This enables a direction-selective evaluation over a plurality of the same type of edges of a change of the exhaust gas state quantity that is to be measured, for example a rise in the oxygen content of the exhaust gas.

Figure 5:
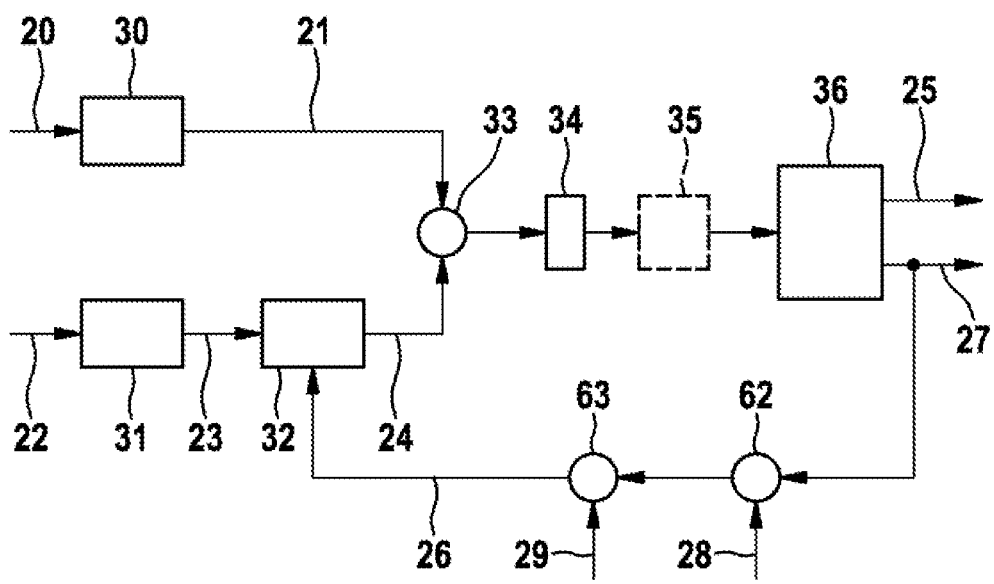
FIG. 5 shows a block diagram for the determination of the dead time TS of an exhaust gas sensor according to an alternative evaluation method.

FIG. 5 shows a block diagram for determining dead time $\tau_S$ of an exhaust gas sensor 15 according to an alternative evaluation method. The design again corresponds as closely as possible to the design described in FIG. 2. In this exemplary embodiment, however, maximum value recognition unit 36 does not directly supply a model dead time $\tau_M$ 26 as output signal, but rather supplies a change in volume $\Delta V$ 27. The change in volume is added to a volume V 28 in a summation unit 62, and in a second division unit 63 the result is related to a volume flow v 29, from which model dead time $\tau_M$ 26 results.

Because dead time $\tau_S$ of exhaust gas sensor 15 is a gas runtime, it is a function of volume flow v 29 of the exhaust gas and of volume V 28 of the exhaust gas system between outlet 17 of internal combustion engine 10 and the location of installation of exhaust gas sensor 15. In the present exemplary embodiment, maximum value recognition unit 36 is therefore modified in such a way that it does not vary model dead time $\tau_M$ 26, but rather calculatively varies volume V 28 corresponding to the change in volume $\Delta V$ 27 in relation to the standard state of the exhaust gas system. For a known volume flow v 29, model dead time $\tau_M$ 26, and, correspondingly, dead time $\tau_S$ of exhaust gas sensor 15 can be determined therefrom:

$$\tau = \frac{V + \Delta V}{v} \quad (5)$$

What is claimed is:

1. A method for determining a dead time in a response characteristic of an exhaust gas sensor for determining an exhaust gas state quantity in an exhaust gas duct of an internal combustion engine, comprising:
measuring an output signal of the exhaust gas sensor;
determining one an undelayed comparison signal or an undelayed comparison characteristic quantity derived from the undelayed comparison signal; and
forming, using a cross-correlation function, a cross-correlation between (i) one of the measured output signal or a characteristic quantity derived from the measured output signal and (ii) one of the comparison signal delayed by a model dead time or the derived comparison characteristic quantity delayed by the model dead time, wherein the model dead time is selected in such a way that the cross-correlation function assumes a maximum, and wherein the dead time of the measured output signal of the exhaust gas sensor is set equal to the selected model dead time.

2. The method as recited in claim 1, wherein the one of the undelayed comparison signal or the undelayed comparison characteristic quantity derived from the undelayed comparison signal is modeled.

3. The method as recited in claim 1, further comprising:
performing, before the formation of the cross-correlation, a low-pass filtering of the one of the undelayed comparison signal or the undelayed comparison characteristic quantity derived from the undelayed comparison signal.

4. The method as recited in claim 1, further comprising:
performing, before the formation of the cross-correlation, a high-pass filtering of (i) one of the measured output signal or the characteristic quantity derived from the measured output signal, and (ii) the one of the undelayed comparison signal or the undelayed comparison characteristic quantity derived from the undelayed comparison signal.

5. The method as recited in claim 3, further comprising:
determining a sensor time constant of the exhaust gas sensor, wherein a low-pass filter time constant is set equal to the low-pass filtering of the determined sensor time constant.

6. The method as recited in claim 1, wherein the cross-correlation function is one of a normed energy cross-correlation function or the square of a normed energy cross-correlation function.

7. The method as recited in claim 1, wherein an integration time span in the calculation of the energy cross-correlation function includes at least one edge of a change of the exhaust gas state quantity.

8. The method as recited in claim 7, wherein the integration time span begins in one of a time-controlled or event-controlled manner.

9. The method as recited in claim 7, wherein positive and negative edges of a change of the exhaust gas state quantity are evaluated separately.

10. The method as recited in claim 9, wherein the separate evaluations of positive and negative edges are achieved by a high-pass filtering and downstream saturation elements.

11. The method as recited in claim 1, wherein in order to determine the maximum of the cross-correlation, a volume value of the exhaust gas duct between the internal combustion engine and the location of the exhaust gas sensor is varied in such a way that the cross-correlation function assumes a maximum.

12. The method as recited in claim 1, wherein the method is for the determination of a dead time in the response characteristic of one of a broadband lambda sensor or an $NO_x$ sensor.

13. A control unit for controlling an internal combustion engine and for determining a dead time in a response characteristic of an exhaust gas sensor, comprising:
at least one of means for measuring an output signal of the exhaust gas sensor and means for determining a characteristic quantity derived from the output signal;
at least one of means for determining a comparison signal and means for determining a comparison characteristic quantity derived from the comparison signal;
one of means for determining an undelayed comparison signal or means for determining an undelayed comparison characteristic quantity derived from the undelayed comparison signal;
means for forming, using a cross-correlation function, a cross-correlation between (i) one of the measured output signal or the characteristic quantity derived from the measured output signal and (ii) one of the comparison signal delayed by a model dead time or the derived comparison characteristic quantity delayed by the model dead time; and
a maximum value recognition unit for the variation of the model dead time and for the recognition of a maximum of the cross-correlation function at the model dead time, wherein the model dead time is selected in such a way that the cross-correlation function assumes the maximum, and wherein the dead time of the measured output signal of the exhaust gas sensor is set equal to the selected model dead time.

* * * * *